(12) United States Patent
Gill (10) Patent No.: US 6,549,383 B1
(45) Date of Patent: Apr. 15, 2003

(54) PINNED LAYER HAVING A COFENB OR COFENBHF FILM FOR INCREASING MAGNETIC SOFTNESS AND REDUCING CURRENT SHUNTING

(75) Inventor: Hardayal Singh Gill, Portala Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 09/684,253

(22) Filed: Oct. 6, 2000

(51) Int. Cl.[7] ................................................ G11B 5/39
(52) U.S. Cl. ................................................ 360/324.11
(58) Field of Search ........................ 360/324.1, 324.11, 360/34.12, 324.2

(56) References Cited

U.S. PATENT DOCUMENTS

| | | | | |
|---|---|---|---|---|
| 6,226,159 B1 | 5/2001 | Pinarbasi | ............... | 360/324.11 |
| 6,315,839 B1 | 11/2001 | Pinarbasi et al. | ........... | 148/108 |
| 6,327,122 B1 * | 12/2001 | Pinarbasi | ............... | 360/324.11 |
| 6,356,419 B1 * | 3/2002 | Gill | ........................ | 360/324.11 |

* cited by examiner

*Primary Examiner*—David L. Ometz
(74) *Attorney, Agent, or Firm*—Ervin F. Johnston (57) ABSTRACT

The present invention provides a pinned layer which has a middle film of cobalt iron niobium (CoFeNb) or cobalt iron niobium hafnium (CoFeNbHf) between first and second cobalt based films, such as cobalt iron (CoFe) or cobalt (Co). The first film is exchange coupled to a nickel oxide (NiO) pinning layer and serves as a seed layer for improving the texture of layers of the spin valve sensor sputter deposited thereon. The second film insulates the middle film from subsequent layers of the spin valve sensor so as to improve the performance of the spin valve sensor. The present pinned layer is preferably employed as only the first AP pinned layer in an AP pinned layer structure.

10 Claims, 6 Drawing Sheets

FIG. 11
(ABS)

FIG. 12

PINNED LAYER HAVING A COFENB OR COFENBHF FILM FOR INCREASING MAGNETIC SOFTNESS AND REDUCING CURRENT SHUNTING

BACKGROUND OF THE INVENTION

1. Field of the Invention

The present invention relates to a pinned layer in a spin valve sensor which has a cobalt iron niobium (CoFeNb) or cobalt iron niobium hafnium (CoFeNbHf) film for increasing the magnetic softness and reducing current shunting of the pinned layer and, more particularly, to a pinned layer wherein the cobalt iron niobium (CoFeNb) or cobalt iron niobium hafnium (CoFeNbHf) film is located between first and second cobalt based films.

2. Description of the Related Art

A spin valve sensor is employed by a read head for sensing magnetic signal fields from a moving magnetic medium, such as a rotating magnetic disk. The sensor includes a nonmagnetic electrically conductive spacer layer sandwiched between a ferromagnetic pinned layer and a ferromagnetic free layer. An antiferromagnetic pinning layer interfaces the pinned layer for pinning a magnetic moment of the pinned layer 90° to an air bearing surface (ABS) wherein the ABS is an exposed surface of the sensor that faces the magnetic disk. First and second leads are connected to the spin valve sensor for conducting a sense current therethrough. A magnetic moment of the free layer is free to rotate upwardly and downwardly with respect to the ABS from a quiescent or bias point position in response to positive and negative magnetic field signals from a rotating magnetic disk. The quiescent position, which is preferably parallel to the ABS, is the position of the magnetic moment of the free layer with the sense current conducted through the sensor in the absence of signal fields.

The thickness of the spacer layer is chosen so that shunting of the sense current and a magnetic coupling between the free and pinned layers is minimized. This thickness is typically less than the mean free path of electrons conducted through the sensor. With this arrangement, a portion of the conduction electrons is scattered at the interfaces of the spacer layer with the pinned and free layer layers. When the magnetic moments of the pinned and free layer layers are parallel with respect to one another scattering is minimal and when their magnetic moments are antiparallel scattering is maximized. Changes in scattering changes the resistance of the spin valve sensor as a function of cos θ, where θ is the angle between the magnetic moments of the pinned and free layer layers. The sensitivity of the sensor is quantified as magnetoresistive coefficient dr/R where dr is the change in the resistance of the sensor as the magnetic moment of the free layer rotates from a position parallel with respect to the magnetic moment of the pinned layer to an antiparallel position with respect thereto and R is the resistance of the sensor when the magnetic moments are parallel.

In addition to the spin valve sensor the read head includes nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a top or a bottom spin valve sensor depending upon whether the pinning layer is located near the bottom of the sensor close to the first read gap layer or near the top of the sensor close to the second read gap layer. Spin valve sensors are further classified as simple pinned or antiparallel (AP) pinned depending upon whether the pinned layer is one or more ferromagnetic films with a unidirectional magnetic moment or an antiparallel (AP) pinned layer structure wherein a pair of ferromagnetic AP pinned layers are separated by an AP coupling layer with magnetic moments of the AP pinned layers being antiparallel. Spin valve sensors are still further classified as single or dual wherein a single spin valve sensor employs only one pinned layer or structure and a dual spin valve sensor employs two pinned layers or structures with the free layer located therebetween.

Because of the interfacing of the pinning layer and the pinned layer the pinned layer is exchange coupled to the pinning layer. A unidirectional orientation of the magnetic spins of the pinning layer pins the magnetic moment of the pinned layer in the same direction. The orientation of the magnetic spins of the pinning layer are set by applying heat close to or above a blocking temperature of the material of the pinning layer in the presence of a field that is directed perpendicular to the ABS. The blocking temperature is the temperature at which all of the magnetic spins of the pinning layer are free to rotate in response to an applied field. During the setting, the magnetic moment of the pinned layer is oriented parallel to the applied field and the magnetic spins of the pinning layer follow the orientation of the pinned layer. When the heat is reduced below the blocking temperature the magnetic spins of the pinning layer pin the orientation of the magnetic moment of the pinned layer. The pinning function is effective as long as the temperature remains substantially below the blocking temperature.

In the presence of some magnetic fields the magnetic moment of the pinned layer can be rotated antiparallel to the pinned direction. The question then is whether the magnetic moment of the pinned layer will return to the pinned direction when the magnetic field is relaxed. This depends upon the strength of the exchange coupling field between the pinning layer and the pinned layer and the magnetic stiffness of the pinned layer. A measure of the stiffness of the free layer is its easy axis coercivity $H_C$ or uniaxial anisotropy $H_K$. The easy axis coercivity is the amount of field required to switch the orientation of the magnetic moment of the free layer 180° along its easy axis while uniaxial anisotropy $H_K$ is the amount of field required to rotate the magnetic field 90° from its easy axis. If the coercivity of the pinned layer exceeds the exchange coupling field between the pinning layer and the pinned layer the exchange coupling field will not be strong enough to bring the magnetic moment of the pinned layer back to the original pinned direction. Until the magnetic spins of the pinning layer are reset the read head is rendered inoperative.

A desirable material for a pinned layer is cobalt iron (CoFe). It has been found that when a cobalt iron (CoFe) pinned layer is exchange coupled to a nickel oxide (NiO) pinning layer that the cobalt iron (CoFe) pinned layer acts as a seed layer for promoting a desirable texture of layers formed thereon. The result is an increase in the magnetoresistive coefficient dr/R of the spin valve sensor. Unfortunately, however, cobalt iron (CoFe) is magnetically stiff as manifested by its coercivity and uniaxial anisotropy. Accordingly, there is a strong felt need to decrease the magnetic stiffness of a cobalt iron (CoFe) pinned layer so that the exchange coupling field between the pinning layer and the cobalt iron (CoFe) pinned layer will return the magnetic moment of the cobalt iron (CoFe) pinned layer to its original orientation after being rotated therefrom.

SUMMARY OF THE INVENTION

The present invention provides a middle film composed of cobalt iron niobium (CoFeNb) or cobalt iron niobium hafnium (CoFeNbHf) which is located between first and second films composed of a cobalt based material which is preferably cobalt iron (CoFe). The magnetic stiffness of such a pinned layer is significantly less than a single cobalt based layer and is more responsive to magnetic spins of a pinning layer for returning a magnetic moment of the pinned layer to its original orientation perpendicular to the ABS when it is rotated therefrom by some extraneous magnetic field. As compared to nickel iron (NiFe), which has been considered as a middle film in the pinned layer, cobalt iron niobium (CoFeNb) or cobalt iron niobium hafnium (CoFeNbHf) has a 20% higher magnetization than nickel iron (NiFe). This means that cobalt iron niobium (CoFeNb) or cobalt iron niobium hafnium (CoFeNbHf) is more magnetically soft than nickel iron (NiFe). Another important advantage is that the cobalt iron niobium (CoFeNb) or the cobalt iron niobium hafnium (CoFeNbHf) middle film has significantly less sense current shunting than a nickel iron (NiFe) middle film. The first cobalt based film interfaces the pinning layer and provides the aforementioned desirable textures for subsequent layers deposited thereon by acting as a seed layer. The second cobalt based film interfaces the spacer layer and further increases the magnetoresistive coefficient dr/R of the spin valve sensor. The niobium (Nb) in the middle film raises the resistance of the middle film by making it amorphous. The hafnium (Hf) is optionally employed for adjusting the magnetostriction of the pinned layer more negative to a desirable zero value. The preferred middle film is cobalt iron niobium hafnium ($Co_{85}Fe_2Nb_{10}Hf_{2-5}$). The present pinned layer can be a single pinned layer in either a top or a bottom spin valve sensor and or employed in one or both AP pinned layers in an AP pinned layer structure. In the preferred embodiment the spin valve sensor employs an AP pinned layer structure with the first AP pinned layer next to the pinning layer structure incorporating the present pinned layer.

An object of the present invention is provide a pinned layer which has first and second cobalt based films for increasing a magnetoresistive coefficient dr/R of a spin valve sensor and a middle film which has less magnetic stiffness than the first and second cobalt based films and less current shunting as compared to a nickel iron (NiFe) middle layer.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
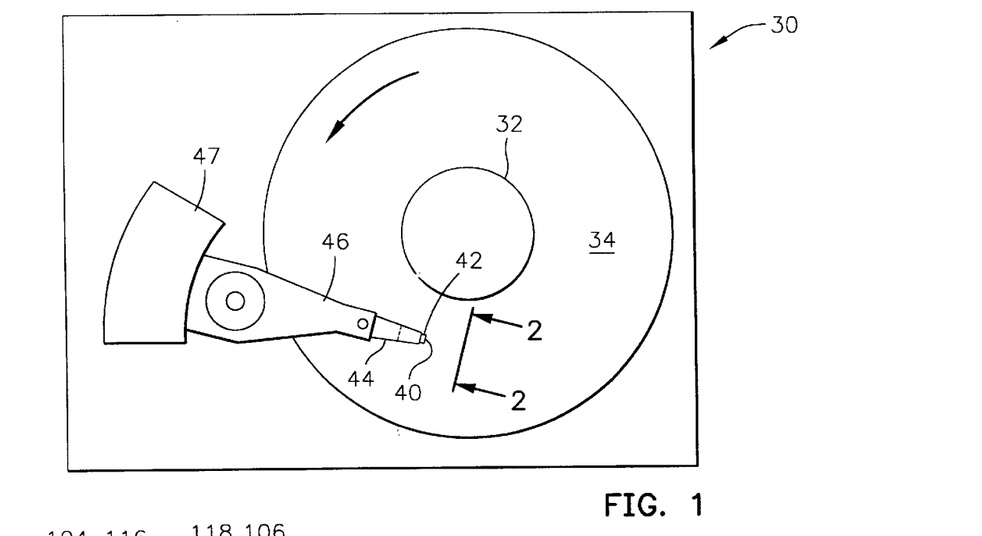
FIG. 1 is a planar view of an exemplary magnetic disk drive.
Figure 2:
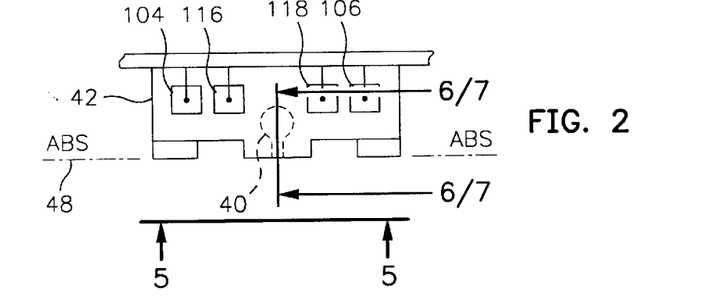
FIG. 2 is an end view of a slider with a magnetic head of the disk drive as seen in plane 2—2.
Figure 3:
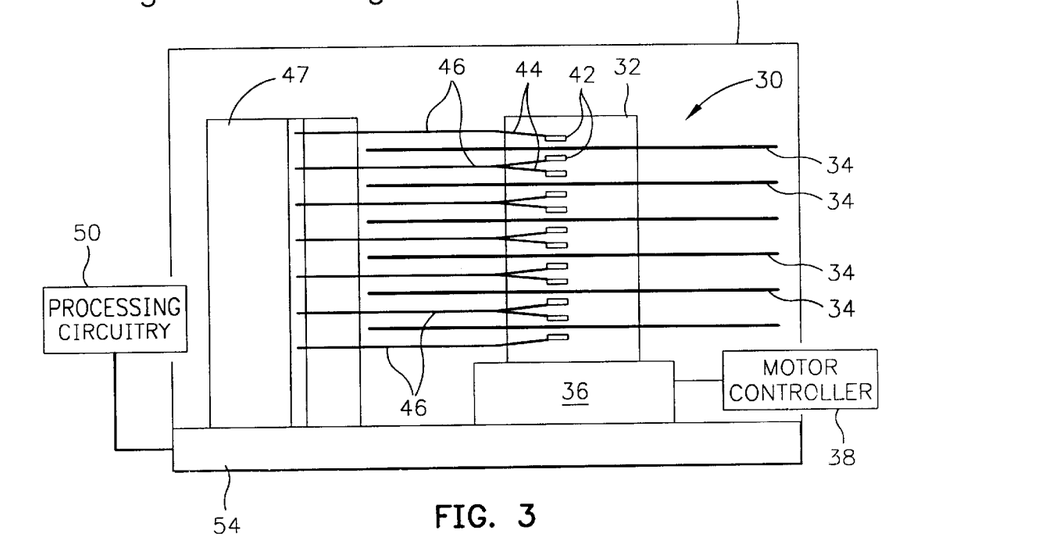
FIG. 3 is an elevation view of the magnetic disk drive wherein multiple disks and magnetic heads are employed.
Figure 4:
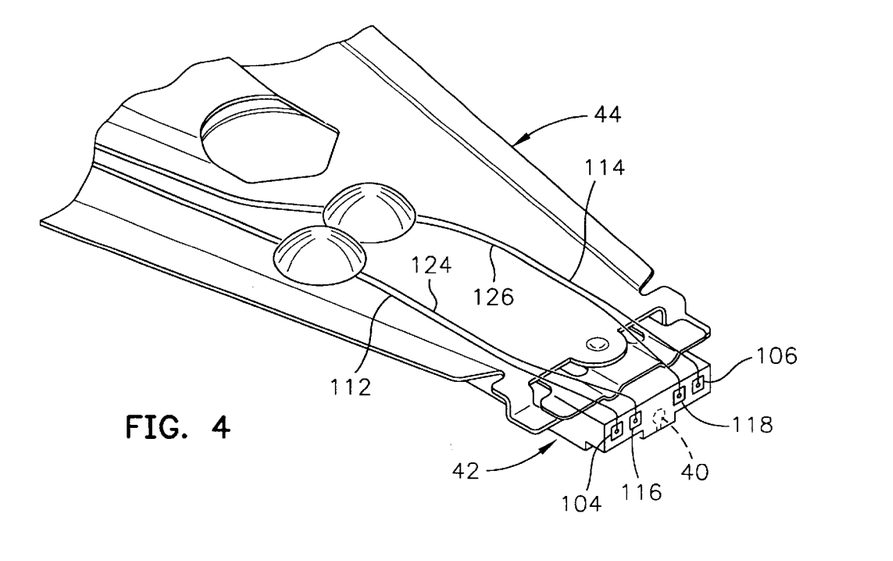
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 supports a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
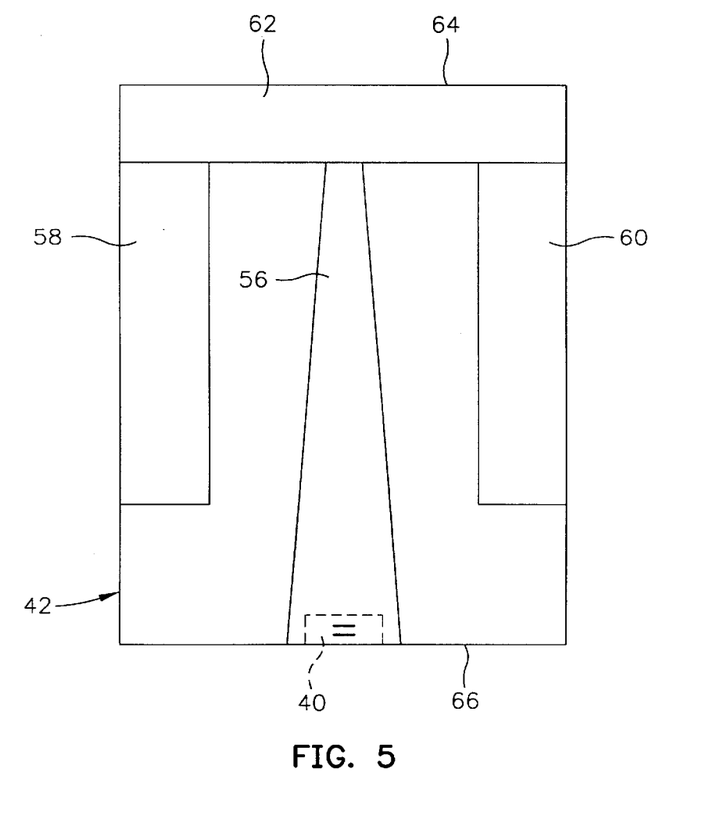
FIG. 5 is an ABS view of the slider taken along plane 5—5 of FIG. 2.

FIG. 5 is an ABS view of the slider 42 and the magnetic head 40. The slider has a center rail 56, which supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
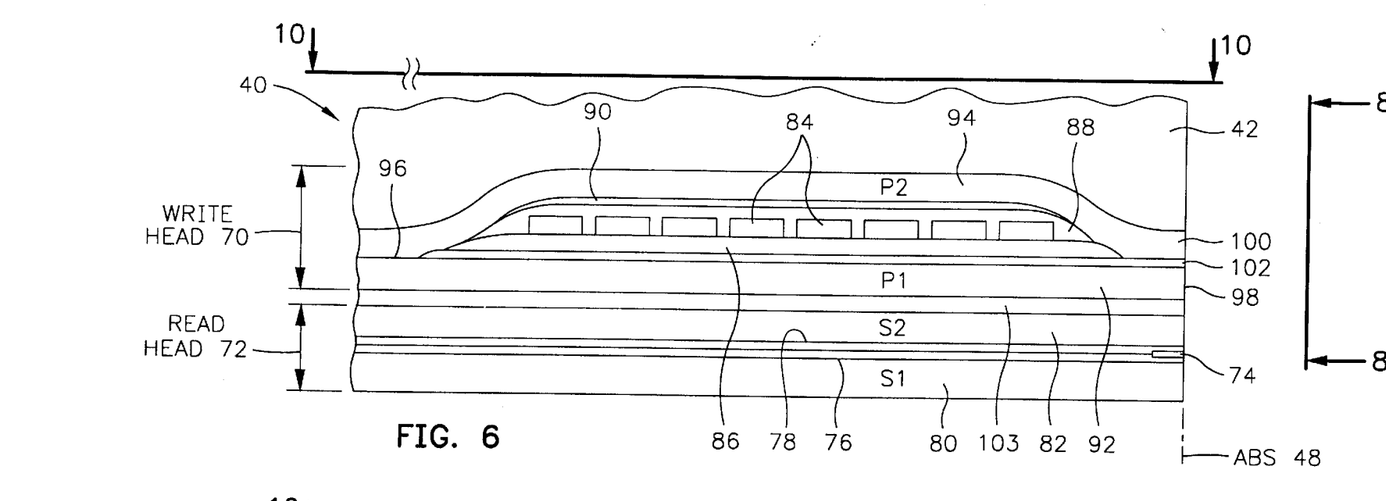
FIG. 6 is a partial view of the slider and a piggyback magnetic head as seen in plane 6—6 of FIG. 2.
Figure 8:
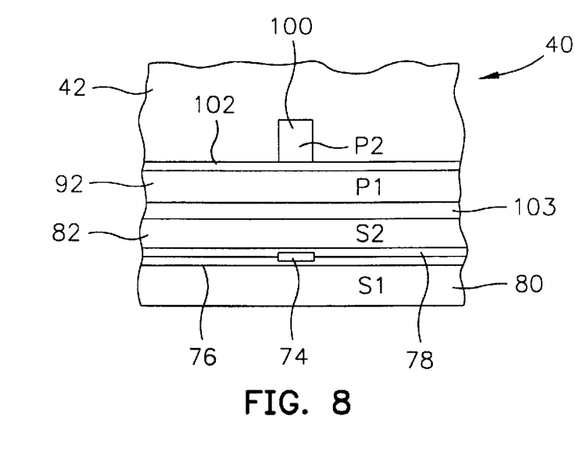
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current Is conducted through the sensor causes these resistance changes to be manifested as potential changes.

These potential changes are then processed as readback signals by the processing circuitry 50 shown in FIG. 3.

Figure 10:
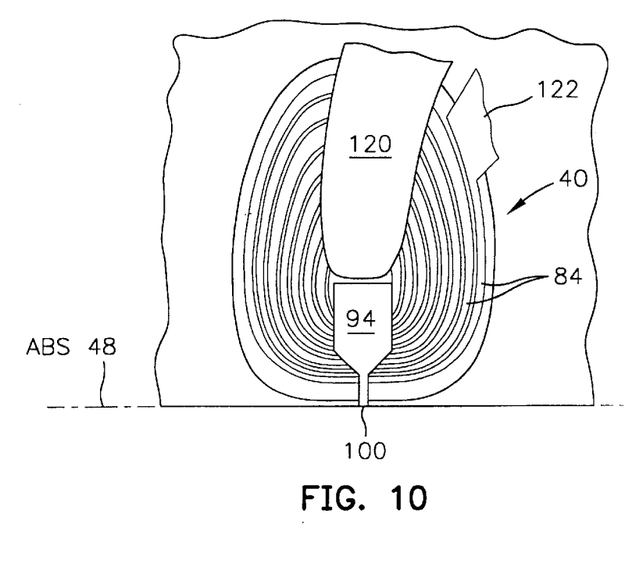
FIG. 10 is a view taken along plane 10—10 of FIG. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 7:
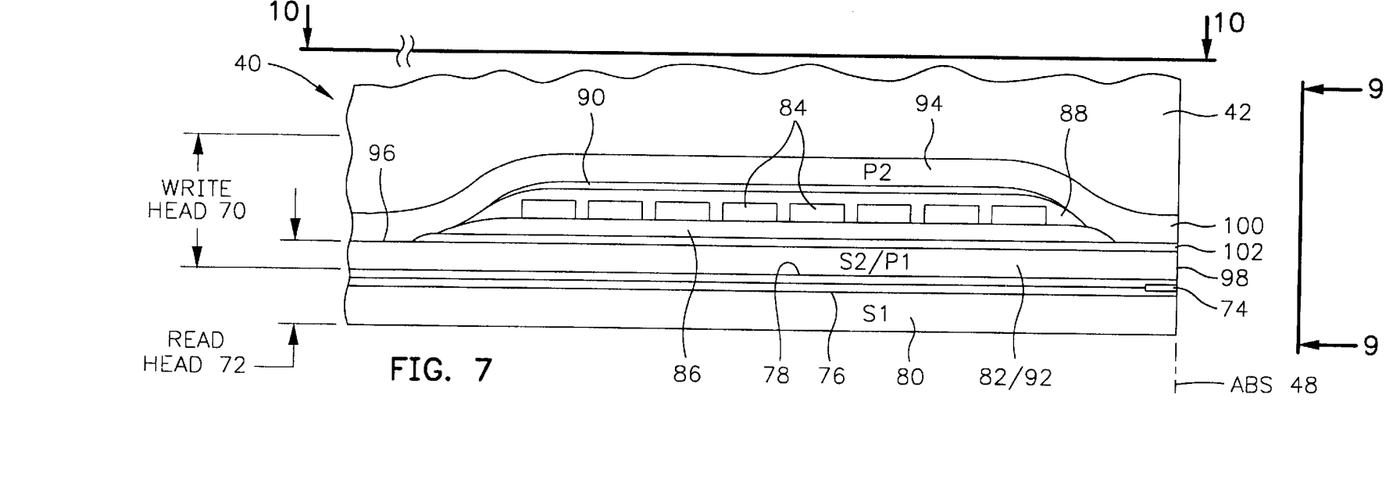
FIG. 7 is a partial view of the slider and a merged magnetic head as seen in plane 7—7 of FIG. 2.
Figure 9:
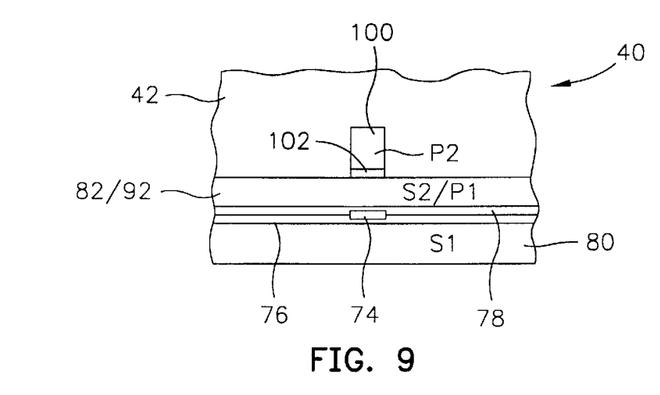
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
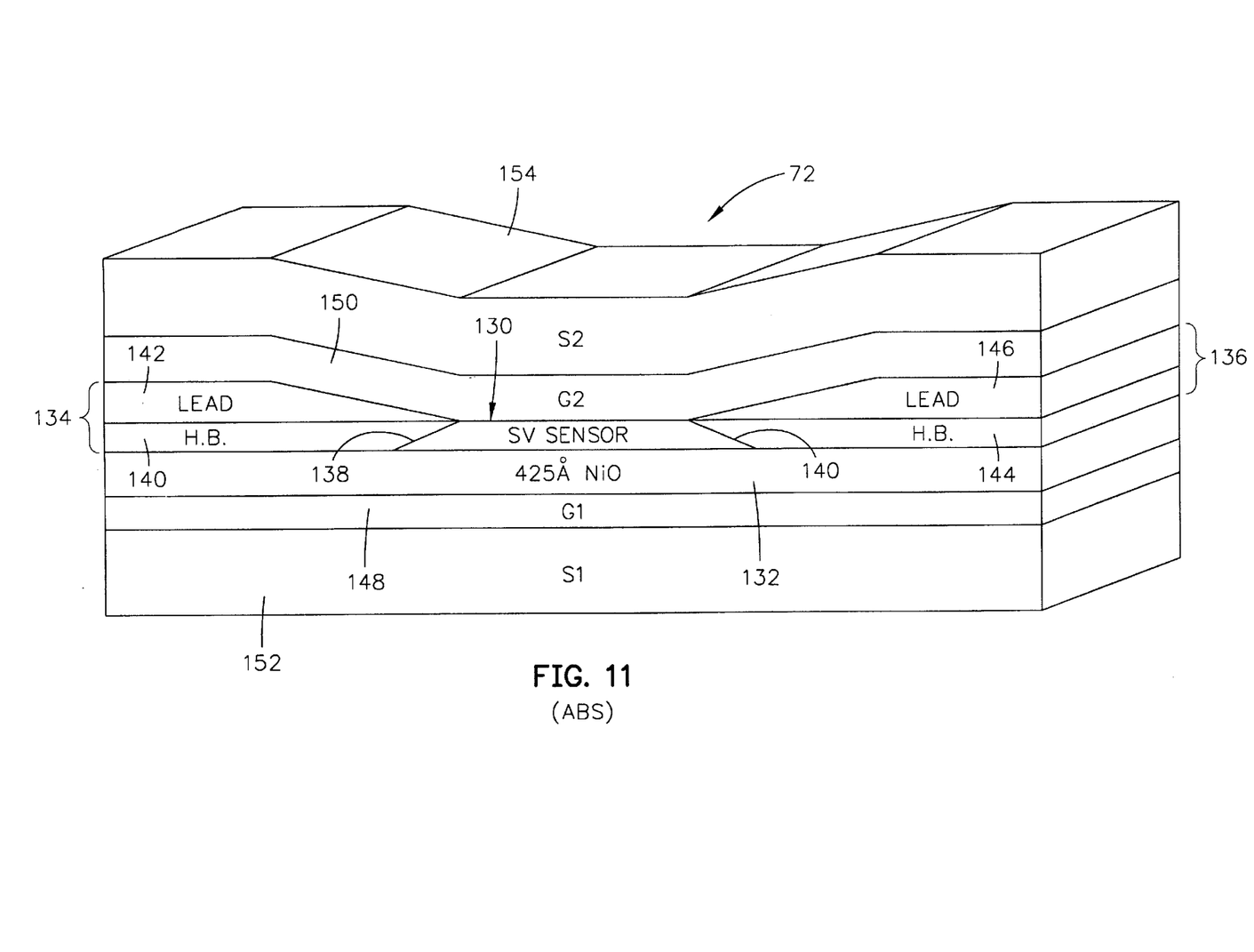
FIG. 11 is an isometric ABS illustration of an exemplary read head which employs the present spin valve sensor.

FIG. 11 is an isometric ABS illustration of the read head 72 which employs the present spin valve sensor 130 with a pinning layer 132 which may be nickel oxide (NiO). First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037. The first hard bias and lead layers include a first hard bias layer 140 and a first lead layer 142 and the second hard bias and lead layers 136 include a second hard bias layer 144 and a second lead layer 146. The hard bias layers 140 and 144 cause magnetic flux to extend longitudinally through the spin valve sensor 130 for stabilizing magnetic domains of the free layer. The spin valve sensor 130 and the first and second hard bias and lead layers 134 and 136 are located between nonmagnetic electrically insulative first and second read gap layers 148 and 150. The first and second read gap layers 148 and 150 are, in turn, located between first and second shield layers 152 and 154.

The Invention

Figure 12:
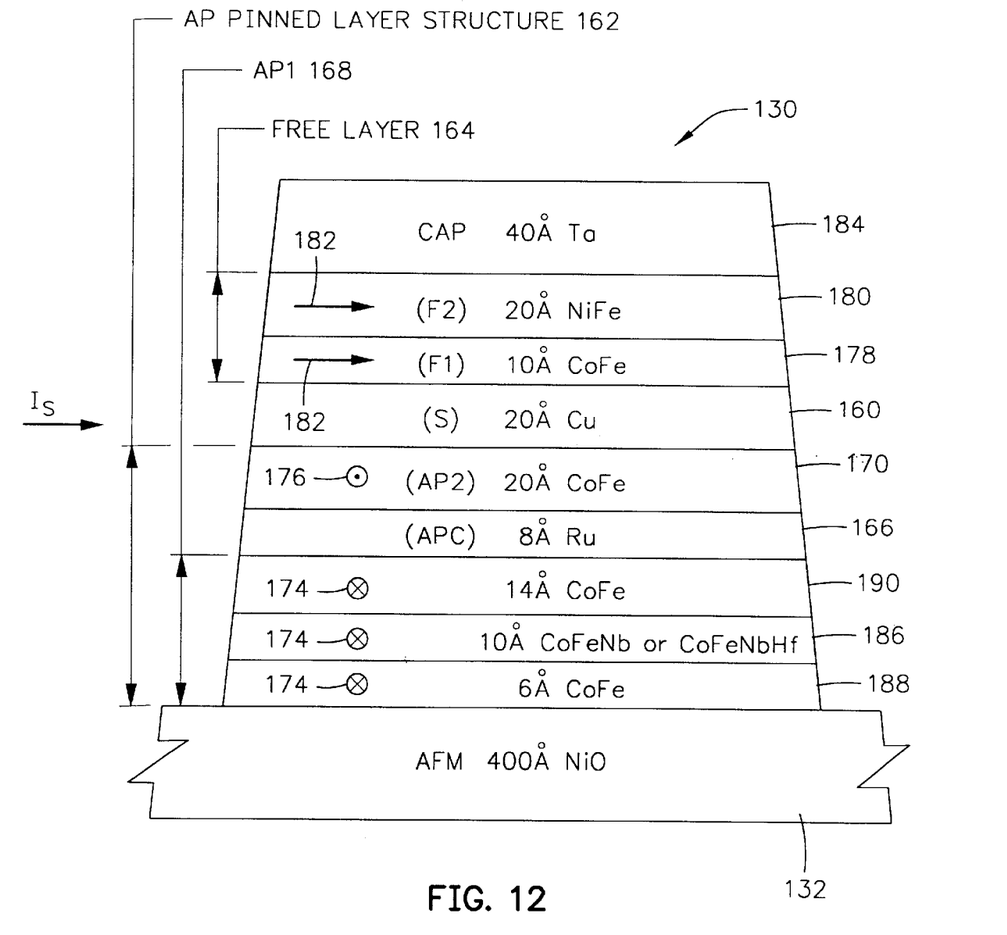
FIG. 12 is an ABS illustration of the present spin valve sensor.

FIG. 12 illustrates the present spin valve sensor 130 which includes a nonmagnetic electrically conductive spacer layer (S) 160 which is located between an antiparallel (AP) pinned layer structure 162 and a free layer 164. The AP pinned layer structure 162 includes an antiparallel coupling (APC) layer 166 which is located between first and second AP pinned layers (AP1 and AP2) 168 and 170. The first AP pinned layer 168 is exchange coupled to an antiferromagnetic (AFM) pinning layer 132 so that the magnetic spins of the pinning layer pin a magnetic moment 174 of the AP pinned layer 168 perpendicular to the ABS in a direction into or out of the sensor, such as into the sensor as shown in FIG. 12. By strong antiparallel coupling between the first and second AP pinned layers 168 and 170 the second AP pinned layer 170 has a magnetic moment 176 which is antiparallel to the magnetic moment 174.

The free layer 164 may comprise first and second free films (F1 and F2) 178 and 180. The first free film 178 is composed of a cobalt based material, preferably cobalt iron (CoFe), which has been found to increase the magnetoresistive coefficient dr/R of the spin valve sensor. The second free film 180 is composed of nickel iron (NiFe) for providing magnetic softness to the free layer 164. The free layer 164 has a magnetic moment 182 which is directed parallel to the ABS in a direction to the right or to the left, such as to the right as shown in FIG. 12. When a signal field rotates the magnetic moment 182 upwardly into the head the magnetic moments 182 and 176 become more antiparallel which increases the resistance of the spin valve sensor to the sense current $I_S$ and when a signal field rotates the magnetic moment 182 downwardly out of the spin valve sensor the magnetic moments 182 and 176 become more parallel which decreases the resistance of the sensor to the sense current $I_S$. These increases and decreases in resistance of the spin valve sensor are processed as playback signals by the processing circuitry 50 in FIG. 3. A nonmagnetic cap layer 184 may be located on the free layer structure 164 for protecting it from subsequent processing steps.

In the present invention the first AP pinned layer 168 is provided with a middle film 186 composed of cobalt iron niobium (CoFeNb) or cobalt iron niobium hafnium (CoFeNbHf) which is located between first and second cobalt based films 188 and 190, such as cobalt (Co) or cobalt iron (CoFe). In a preferred embodiment the middle film 186 is cobalt iron niobium hafnium (CoFeNbHf) and the first and second films 188 and 190 are cobalt iron (CoFe). When the first film 188 interfaces the nickel oxide (NiO) pinning layer 132 the subsequent layers deposited on the first film 188 by sputter deposition have a desirable texture for increasing the magnetoresistive coefficient dr/R of the sensor. The second film 190 next to the antiparallel coupling layer 166 insulates the middle film 186 therefrom and provides an improved antiparallel coupling between the first and second AP pinned layers 168 and 170. The niobium (Nb) in the middle film 186 makes the middle film amorphous so as to increase its resistance. The hafnium (Hf) in the middle layer adjusts a typically positive magnetostriction of the middle film more negative to a zero magnitude, if desired. A preferred composition of the middle film is $Co_{85}Fe_2Nb_{10}Hf_{2-5}$.

Exemplary thicknesses of materials for the layers are 400 Å of nickel oxide (NiO) for the pinning layer 172, 6 Å of cobalt iron (CoFe) for the first film 188, 10 Å of cobalt iron niobium hafnium (CoFeNbHf) for the middle film 186, 14 Å of cobalt iron (CoFe) for the second film 190, 8 Å of ruthenium (Ru) for the antiparallel coupling layer 166, 20 Å of cobalt iron (CoFe) for the second AP pinned layer 170, 20 Å of copper (Cu) for the spacer layer 160, 10 Å of cobalt iron (CoFe) for the first free film 178, 20 Å of nickel iron (NiFe) for the second free film 180 and 40 Å of tantalum (Ta) for the cap layer 184.

Discussion

In a preferred embodiment the present pinned layer serves as only the first AP pinned layer 168 in an AP pinned layer structure 162 with the second AP pinned layer 170 being a single layer. With this arrangement a demagnetizing field from the AP pinned layer structure 162 on the free layer structure 164 is minimized while maintaining a minimum read gap between the first and second read gap layers 148 and 150 shown in FIG. 11. However, it should be understood that the present pinned layer may also be used in place of the single layer for the second AP pinned layer 170 in FIG. 12. Further, the present pinned layer may be employed in a single pinned layer structure as contrasted to an AP pinned layer structure and may be either in a top or bottom type of spin valve.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head comprising:
   a spin valve sensor including:
      a ferromagnetic free layer that has a magnetic moment;
      a ferromagnetic first pinned layer that has a magnetic moment;
      a nonmagnetic conductive spacer layer located between the free layer and the first pinned layer; and
      an antiferromagnetic metallic first pinning layer exchange coupled to the first pinned layer for pinning the magnetic moment of the first pinned layer; and
   the first pinned layer including:
      first and second films composed of cobalt iron (CoFe); and
      a middle film composed of cobalt iron niobium hafnium ($Co_{85}Fe_2Nb_{10}Hf_{2-5}$) and located between the first and second films;
   first and second hard bias and lead layers connected to the spin valve sensor;
   nonmagnetic nonconductive first and second read gap layers;
   the spin valve sensor and the first and second hard bias and lead layers being located between the first and second read gap layers;
   ferromagnetic first and second shield layers; and
   the first and second read gap layers being located between the first and second shield layers.

2. A magnetic read head comprising:
   a spin valve sensor including:
      a ferromagnetic free layer that has a magnetic moment;
      a ferromagnetic first pinned layer that has a magnetic moment;
      a nonmagnetic conductive spacer layer located between the free layer and the first pinned layer; and
      an antiferromagnetic metallic first pinning layer exchange coupled to the first pinned layer for pinning the magnetic moment of the first pinned layer; and
   the first pinned layer including:
      first and second films composed of cobalt iron (CoFe); and
      a middle film composed of cobalt iron niobium hafnium ($Co_{85}Fe_2Nb_{10}Hf_{2-5}$) and located between the first and second films;
      a second pinned layer; and
      an antiparallel coupling layer located between the first and second pinned layers;
   first and second hard bias and lead layers connected to the spin valve sensor;
   nonmagnetic nonconductive first and second read gap layers;
   the spin valve sensor and the first and second hard bias and lead layers being located between the first and second read gap layers;
   ferromagnetic first and second shield layers; and
   the first and second read gap layers being located between the first and second shield layers.

3. A magnetic head assembly comprising:
   a write head including:
      ferromagnetic first and second pole piece layers having a yoke portion that is located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions;
   the read head including:
      a spin valve sensor;
      first and second hard bias and lead layers connected to the valve sensor;
      nonmagnetic nonconductive first and second read gap layers;
      the spin valve sensor and the first and second hard bias and lead layers being located between the first and second read gap layers;
      a ferromagnetic first shield layer; and
      the first and second gap layers being located between the first shield layer and the first pole piece layer;
   a ferromagnetic second shield layer;
   a nonmagnetic isolation layer; and
   the second shield layer being located between the second gap layer and the isolation layer and the nonmagnetic isolation layer being located between the second shield layer and the first pole piece layer;
   the spin valve sensor including:
      a ferromagnetic free layer that has a magnetic moment;
      a ferromagnetic first pinned layer that has a magnetic moment;
      a nonmagnetic conductive spacer layer located between the free layer and the first pinned layer; and
      an antiferromagnetic metallic first pinning layer exchange coupled to the first pinned layer for pinning the magnetic moment of the first pinned layer; and
   the first pinned layer including:
      first and second films composed of cobalt iron (CoFe); and
      a middle film composed of cobalt iron niobium hafnium ($Co_{85}Fe_2Nb_{10}Hf_{2-5}$) and located between the first and second films.

4. A magnetic head assembly comprising:
   a write head including:
      ferromagnetic first and second pole piece layers having a yoke portion that is located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions;
   the read head including:
      a spin valve sensor;
      first and second hard bias and lead layers connected to the valve sensor;

nonmagnetic nonconductive first and second read gap layers;
the spin valve sensor and the first and second hard bias and lead layers being located between the first and second read gap layers;
a ferromagnetic first shield layer; and
the first and second gap layers being located between the first shield layer and the first pole piece layer;
the spin valve sensor including:
a ferromagnetic free layer that has a magnetic moment;
a ferromagnetic first pinned layer that has a magnetic moment;
a second pinned layer; and
an antiparallel coupling layer located between the first and second pinned layers;
a nonmagnetic conductive spacer layer located between the free layer and the first pinned layer; and
an antiferromagnetic metallic first pinning layer exchange coupled to the first pinned layer for pinning the magnetic moment of the first pinned layer; and
the first pinned layer including:
first and second films composed of cobalt iron (CoFe); and
a middle film composed of cobalt iron niobium hafnium ($Co_{85}Fe_2Nb_{10} Hf_{2-5}$) and located between the first and second films.

5. A magnetic disk drive having a magnetic head assembly which includes a write head and a read head, comprising:
the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;
the read head including:
a spin valve sensor;
first and second hard bias and lead layers connected the spin valve sensor;
nonmagnetic nonconductive first and second read gap layers;
the spin valve sensor being located between the first and second read gap layers;
a ferromagnetic first shield layer; and
the first and second read gap layers being located between the first shield layer and the first pole piece layer;
a ferromagnetic second shield layer;
a nonmagnetic isolation layer; and
the second shield layer being located between the second gap layer and the isolation layer and the nonmagnetic isolation layer being located between the second shield layer and the first pole piece layer;
the spin valve sensor including:
a ferromagnetic free layer that has a magnetic moment;
a ferromagnetic first pinned layer that has a magnetic moment;
a nonmagnetic conductive spacer layer located between the free layer and the first pinned layer; and
an antiferromagnetic metallic first pinning layer exchange coupled to the first pinned layer for pinning the magnetic moment of the first pinned layer; and the first pinned layer including:
first and second films composed of cobalt iron (CoFe); and
a middle film composed of cobalt iron niobium hafnium ($Co_{85}Fe_2Nb_{10}Hf_{2-5}$) and located between the first and second films;
a housing;
a magnetic disk rotatably supported in the housing;
a support mounted in the housing for supporting the magnetic head assembly with an air bearing surface facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and
a processor connected to the magnetic head assembly, to the spindle motor and to the actuator for exchanging signals with the magnetic head assembly, for controlling movement of the magnetic disk and for controlling the position of the magnetic head assembly.

6. A magnetic disk drive having a magnetic head assembly which includes a write head and a read head, comprising:
the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;
the read head including:
a spin valve sensor;
first and second hard bias and lead layers connected the spin valve sensor;
nonmagnetic nonconductive first and second read gap layers;
the spin valve sensor being located between the first and second read gap layers;
a ferromagnetic first shield layer; and
the first and second read gap layers being located between the first shield layer and the first pole piece layer;
the spin valve sensor including:
a ferromagnetic free layer that has a magnetic moment;
a ferromagnetic first pinned layer that has a magnetic moment;
a second pinned layer;
an antiparallel coupling layer located between the first and second pinned layers;
a nonmagnetic conductive spacer layer located between the free layer and the first pinned layer; and
an antiferromagnetic metallic first pinning layer exchange coupled to the first pinned layer for pinning the magnetic moment of the first pinned layer; and
the first pinned layer including:
first and second films composed of cobalt iron (CoFe); and
a middle film composed of cobalt iron niobium hafnium ($Co_{85}Fe_2Nb_{10}Hf_{2-5}$) and located between the first and second films;

a housing;

a magnetic disk rotatably supported in the housing;

a support mounted in the housing for supporting the magnetic head assembly with an air bearing surface facing the magnetic disk so that the magnetic head assembly is in a transducing relationship with the magnetic disk;

a spindle motor for rotating the magnetic disk;

an actuator positioning means connected to the support for moving the magnetic head assembly to multiple positions with respect to said magnetic disk; and a processor connected to the magnetic head assembly, to the spindle motor and to the actuator for exchanging signals with the magnetic head assembly, for controlling movement of the magnetic disk and for controlling the position of the magnetic head assembly.

7. A method of making a magnetic read head comprising the steps of:

making a spin valve sensor as follows:
forming a ferromagnetic free layer that has a magnetic moment;
forming a ferromagnetic first pinned layer that has a magnetic moment;
forming a nonmagnetic conductive spacer layer between the free layer and the first pinned layer; and
forming an antiferromagnetic metallic first pinning layer exchange coupled to the first pinned layer for pinning the magnetic moment of the first pinned layer; and the forming of the first pinned layer including the steps of:
forming first and second films composed of cobalt iron (CoFe); and
forming a middle film composed of cobalt iron niobium hafnium ($Co_{85}Fe_2Nb_{10}Hf_{2-5}$) between the first and second films;

connecting first and second hard bias and lead layers to the spin valve sensor;

forming nonmagnetic nonconductive first and second read gap layers;

forming the spin valve sensor and the first and second hard bias and lead layers between the first and second read gap layers;

forming ferromagnetic first and second shield layers; and forming the first and second read gap layers between the first and second shield layers.

8. A method of making a magnetic read head comprising the steps of:

making a spin valve sensor as follows:
forming a ferromagnetic free layer that has a magnetic moment;
forming a ferromagnetic first pinned layer that has a magnetic moment;
forming a second pinned layer;
forming an antiparallel coupling layer between the first and second pinned layers;
forming a nonmagnetic conductive spacer layer between the free layer and the first pinned layer; and
forming an antiferromagnetic metallic first pinning layer exchange coupled to the first pinned layer for pinning the magnetic moment of the first pinned layer; and the forming of the first pinned layer including the steps of:
forming first and second films composed of cobalt iron (CoFe); and
forming a middle film composed of cobalt iron niobium hafnium ($Co_{85}Fe_2Nb_{10}Hf_{2-5}$) between the first and second films.

9. A method of making a magnetic head assembly comprising the steps of:

making a write head comprising the steps of:
forming ferromagnetic first and second pole piece layers in pole tip, yoke and back gap regions wherein the yoke region is located between the pole tip and back gap regions;
forming a nonmagnetic nonconductive write gap layer between the first and second pole piece layers in the pole tip region;
forming an insulation stack with at least one coil layer embedded therein between the first and second pole piece layers in the yoke region; and
connecting the first and pole piece layers at said back gap region;

making a read head as follows:
forming a spin valve sensor;
connecting first and second hard bias and lead layers to the spin valve sensor;
forming nonmagnetic nonconductive first and second read gap layers;
forming the spin valve sensor and the first and second hard bias and lead layers between the first and second read gap layers;
forming a ferromagnetic first shield layer; and
forming the first and second read gap layers between the first shield layer and the first pole piece layer; and
forming a ferromagnetic second shield layer;
forming a nonmagnetic isolation layer; and
forming the second shield layer between the second gap layer and the isolation layer and the nonmagnetic isolation layer between the second shield layer and the first pole piece layer;

a making of the spin valve sensor including:
forming a ferromagnetic free layer that has a magnetic moment;
forming a ferromagnetic first pinned layer that has a magnetic moment;
forming a nonmagnetic conductive spacer layer between the free layer and the first pinned layer; and
forming an antiferromagnetic metallic first pinning layer exchange coupled to the first pinned layer for pinning the magnetic moment of the first pinned layer; and the forming of the first pinned layer including the steps of:
forming first and second films composed of cobalt iron (CoFe); and
forming a middle film composed of cobalt iron niobium hafnium ($Co_{85}Fe_2Nb_{10}Hf_{2-5}$) between the first and second films.

10. A method of making a magnetic head assembly comprising the steps of:

making a write head comprising the steps of:
forming ferromagnetic first and second pole piece layers in pole tip, yoke and back gap regions wherein the yoke region is located between the pole tip and back gap regions;
forming a nonmagnetic nonconductive write gap layer between the first and second pole piece layers in the pole tip region;
forming an insulation stack with at least one coil layer embedded therein between the first and second pole piece layers in the yoke region; and
connecting the first and pole piece layers at said back gap region;

making a read head as follows:
  forming a spin valve sensor;
  connecting first and second hard bias and lead layers to the spin valve sensor;
  forming nonmagnetic nonconductive first and second read gap layers;
  forming the spin valve sensor and the first and second hard bias and lead layers between the first and second read gap layers;
  forming a ferromagnetic first shield layer; and
  forming the first and second read gap layers between the first shield layer and the first pole piece layer; and
a making of the spin valve sensor including:
  forming a ferromagnetic free layer that has a magnetic moment;
  forming a ferromagnetic first pinned layer that has a magnetic moment;
  forming a second pinned layer;
  forming an antiparallel coupling layer between the first and second pinned layers;
  forming a nonmagnetic conductive spacer layer between the free layer and the first pinned layer; and
  forming an antiferromagnetic metallic first pinning layer exchange coupled to the first pinned layer for pinning the magnetic moment of the first pinned layer; and
the forming of the first pinned layer including the steps of:
  forming first and second films composed of cobalt iron (CoFe); and
  forming a middle film composed of cobalt iron niobium hafnium ($Co_{85}Fe_2Nb_{10}Hf_{2-5}$) between the first and second films.

* * * * *